P. J. MADIGAN.
TRUCK.
APPLICATION FILED OCT. 26, 1916.
1,239,498.
Patented Sept. 11, 1917.
3 SHEETS—SHEET 3.
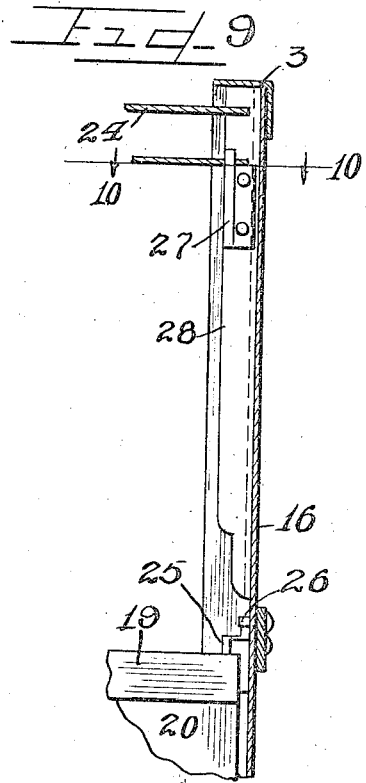
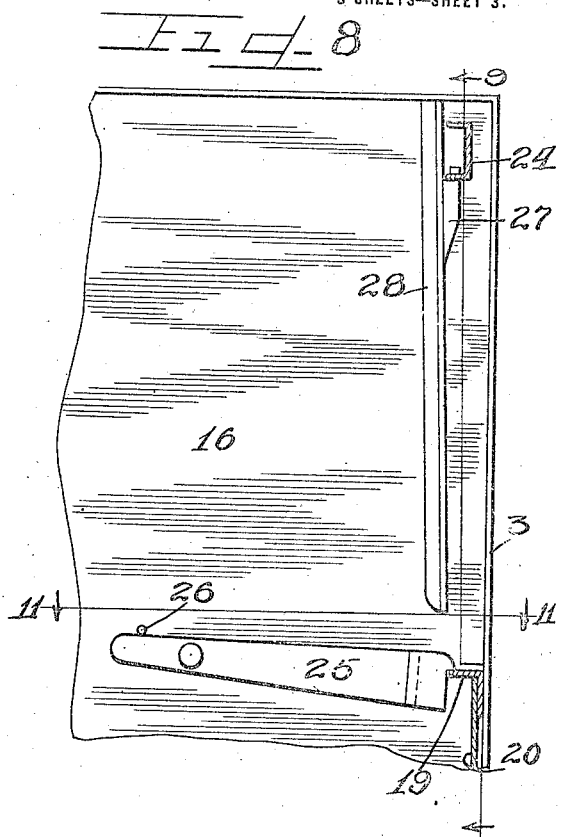
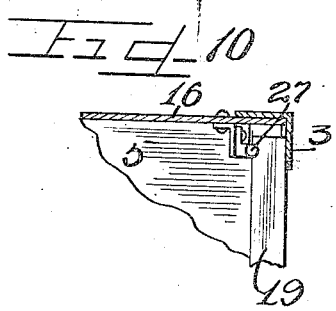
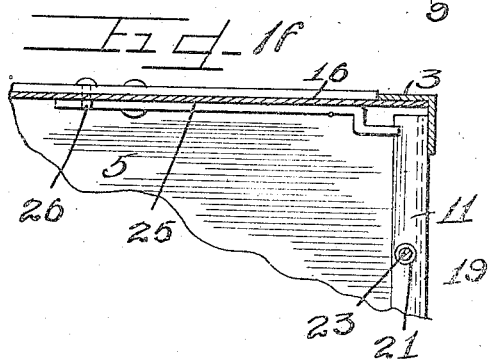
Witnesses
Inventor
Patrick J. Madigan

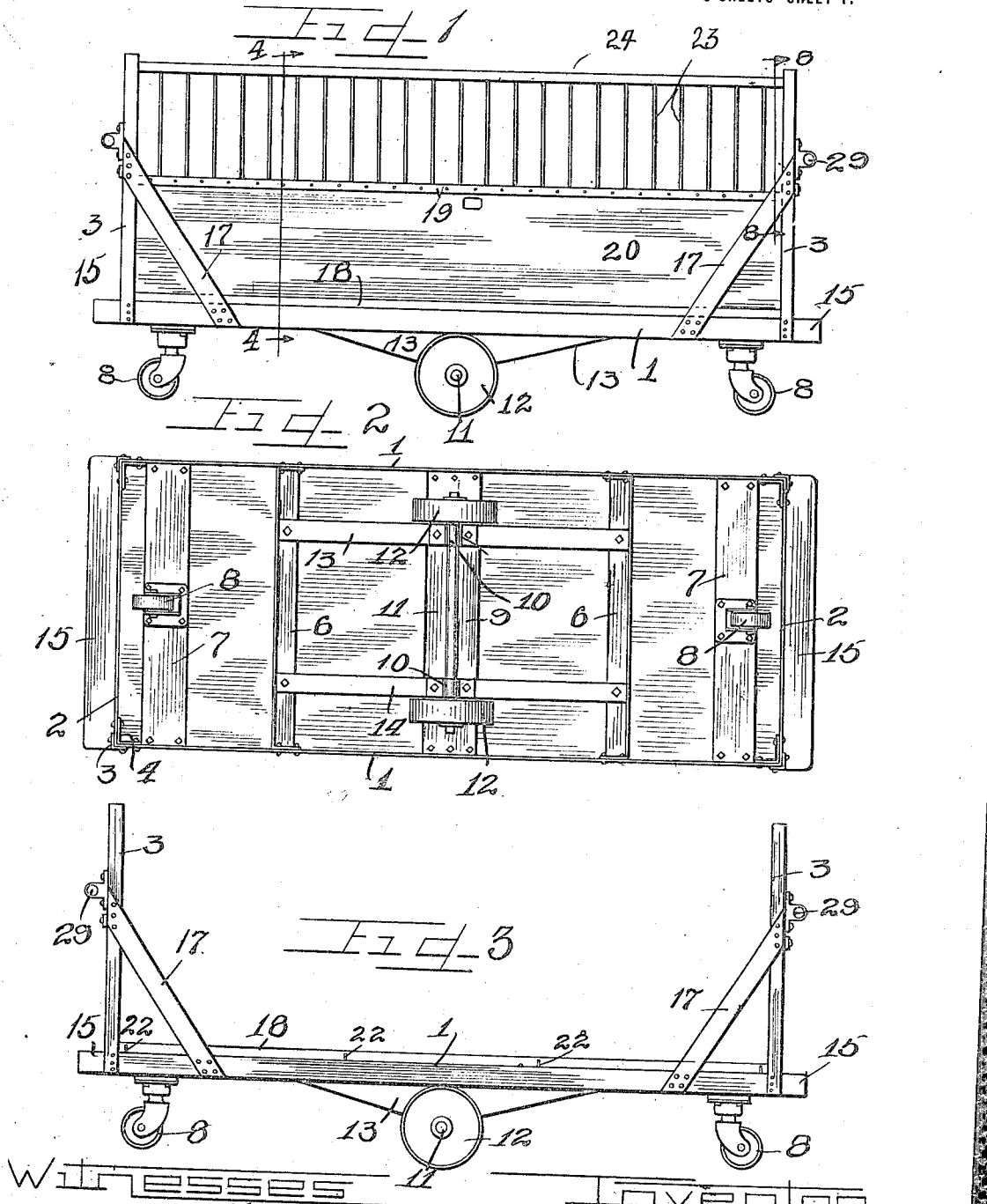

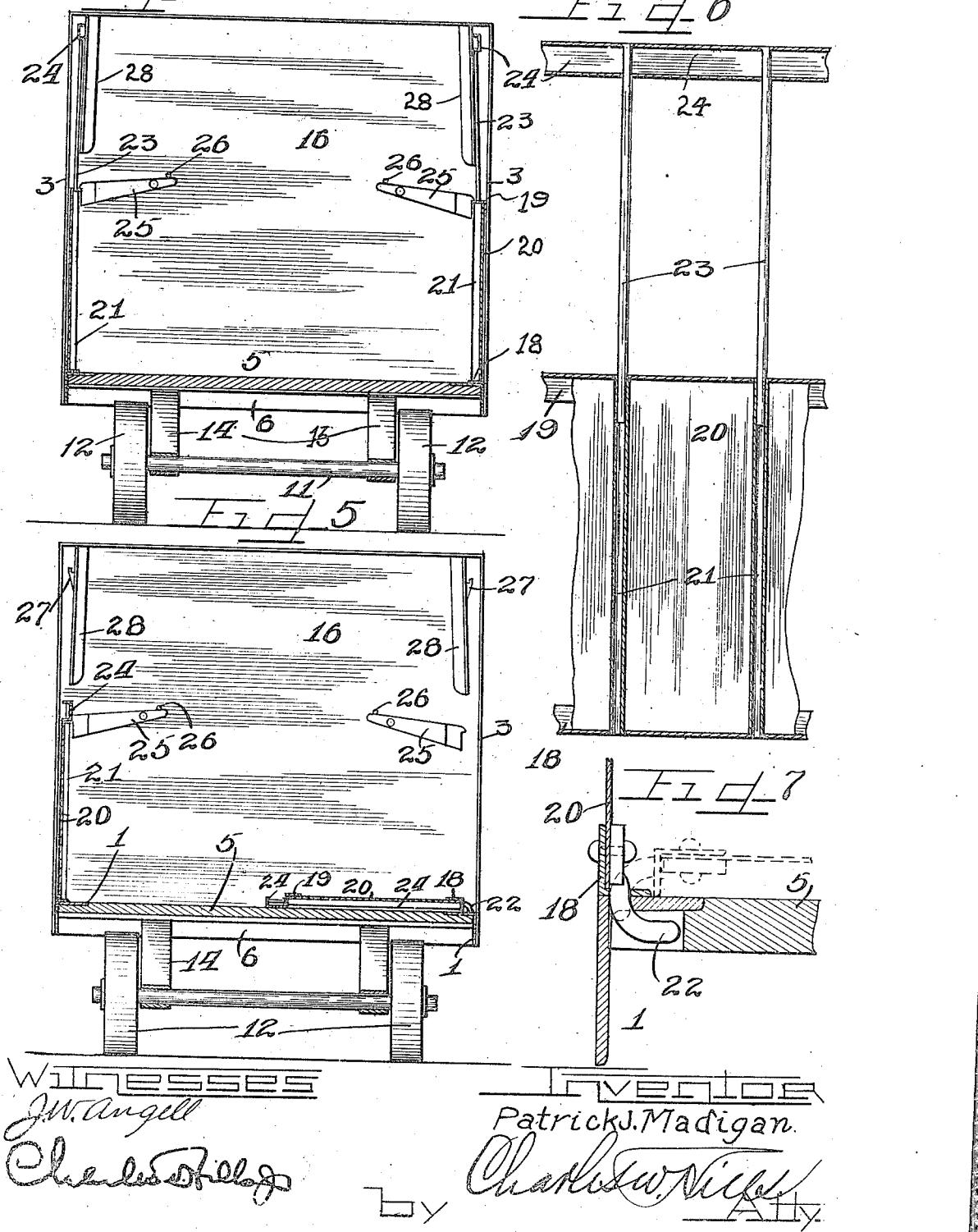

UNITED STATES PATENT OFFICE.

PATRICK J. MADIGAN, OF CHICAGO, ILLINOIS.

TRUCK.

1,239,498.  Specification of Letters Patent.  Patented Sept. 11, 1917.

Application filed October 26, 1916. Serial No. 127,932.

*To all whom it may concern:*

Be it known that I, PATRICK J. MADIGAN, a citizen of the United States, and a resident of the city of Chicago, in the county of Cook and State of Illinois, have invented certain new and useful Improvements in Trucks; and I do hereby declare that the following is a full, clear, and exact description of the same, reference being had to the accompanying drawings, and to the numerals of reference marked thereon, which form a part of this specification.

This invention relates to an improved type of hand truck having adjustable side gates which may be folded out of use entirely or opened only part way, to receive a load of small articles, and capable of being fully extended to receive a large load if necessary.

It is an object therefore of this invention to construct a truck having detachable side walls or gates operatable independently of one another and in a similar manner, and capable of being partially or fully extended, as necessity requires.

It is also an object of this invention to construct a truck provided with telescoping side gates adapted after telescoping to be folded inwardly upon the floor of the truck, and a truck capable of use with the side gates folded out of use or partially or wholly extended, as desired.

It is also an object of this invention to construct a truck having rigid end walls, and foldable and extensible side walls or gates adapted when folded to lie upon the floor of the truck, and when extended interlocked with the end walls, but permitting the truck to be used with the side gates folded or partially or wholly extended, as the case may be.

It is furthermore an important object of this invention to construct a truck having foldable and telescoping walls adapted to be extended or collapsed to permit use of the truck for different purposes, when collapsed and folded, serving to form a false floor of the truck to receive a load thereon.

It is finally an object of this invention to construct a truck well suited for different purposes, obviating the necessity of different trucks for different kinds of articles to be transferred, and so constructed as to be readily adapted for the use required.

The invention (in a preferred form) is illustrated in the drawings and hereinafter more fully described.

In the drawings:

Figure 1 is a side elevation of a truck embodying the principles of my invention, with the side gates extended.

Fig. 2 is a bottom plan view thereof.

Fig. 3 is a view similar to Fig. 1, but illustrating the side gates folded upon the floor and out of use.

Fig. 4 is a detail section taken on line 4—4 of Fig. 1, with the end braces omitted.

Fig. 5 is a similar view, with one of the side gates entirely folded and out of use and the other in use, but with the upper section telescoped thereinto.

Fig. 6 is a fragmentary sectional detail of a side gate member in extended position.

Fig. 7 is a detail sectional view illustrating the hinge connection for the side gate members to the frame or floor of the structure.

Fig. 8 is a fragmentary detail section taken on line 8—8 of Fig. 1, with parts omitted.

Fig. 9 is a detail section taken on line 9—9 of Fig. 8.

Fig. 10 is a fragmentary detail section taken on line 10—10 of Fig. 9.

Fig. 11 is a section taken on line 11—11 of Fig. 8.

As shown in the drawings:

The truck comprises a floor frame embracing side angle iron sills 1, and end angle iron sills 2, suitably and rigidly connected one to another at their corners by outer angle end frame members 3, and inner angle corner plates 4, as shown in Fig. 2. Laid upwardly within said frame beneath the flanges of the angle iron side and end sills thereof, is a floor 5, and said frame is braced transversely intermediate its ends by angle iron cross members 6, as shown in Fig. 2, riveted to the side sills 1. At the ends of said frame timber cross-pieces 7, extend transversely of the frame and are secured thereto in any suitable manner, as for instance by bolts extending through the floor 5, and mounted centrally on each of said timber cross members 7, is a relatively large ball bearing caster wheel 8. Another cross timber 9, extends transversely of the frame at the middle thereof beneath the floor 5, and may be secured thereto by bolts or in any other suitable manner and mounted thereon are bearings 10, in which a shaft or axle 11, is journaled, having wheels 12, on the outer ends thereof. The entire structure is braced by timbers 13 and 14, which are bolted to said cross angle irons 6, and to the middle cross beam 9, acting furthermore to brace the bearings 10, thereon. A wooden bumper beam 15, having rounded corners, is secured on each end of the floor frame of the truck. Sheet metal plates 16, are riveted to said angle iron end frame members 3, to afford rigid end walls for the truck, and diagonal brace members 17, are riveted to the upright portions of the angle irons 3, and to the side sills 1, of the truck.

The side gates or walls of the truck consist of lower angle irons 18, and upper angle irons 19, with sheet metal walls 20, riveted therebetween, and with a plurality of tubular pipe sections 21, brazed or secured in any other suitable manner to the inwardly projecting flanges of the respective upper and lower angle iron members 18 and 19. Said lower sections of the side gates are hingedly or pivotally connected to the side sills 1, of the floor frame of the truck, and for this purpose, as clearly shown in Fig. 7, apertures are provided in the upper flange of the sills 1, and brackets having curved fingers 22, secured to the inner walls of the side gates, project downwardly through the apertures in the sills of the floor frame, permitting the side gates to swing inwardly in the position shown in dotted lines in Fig. 7, and of course the portions of the floor 5, at the points at which the curved fingers project through the sill are cut away, to permit movement of said fingers therein. An upper extensible section is provided forming a part of each of said side gates and capable of telescoping into the lower section, and for this purpose a plurality of rods 23, are mounted to slide in the tubular pipe sections 21, of the lower section, and at their upper ends are brazed to a channel iron 24, which serves to connect said rods rigidly one to another.

Means are provided for automatically locking the lower sections of the side gates in position when the same are swung upwardly into position for use, and this comprises a relatively long pawl lever 25, a pair thereof being pivoted upon each of the end walls 16, of the truck, the outer toothed ends of which normally swing downwardly by gravity limited by stops 26, which contact the tail of the levers. When the side gate is swung upwardly from a folded position or that wherein the same lies upon the floor 5, of the truck 2, into a position shown in Figs. 4, 8, and 11, the upper angle bar 19, of the lower section of the side gate trips the lever 25, upwardly and the same then falls by gravity to engage the inner end of the flange of the angle bar 19, holding the side gate upright. Of course the side gate is prevented from swinging outwardly due to the engagement of the hinge fingers 22, thereon beneath the flange of the side sill 1, and furthermore by the diagonal end braces 17. For the purpose of holding the upper section of the side gates extended when the side gates are erected for use, bracket pieces 27, are provided adapted to project through an aperture provided in the lower flange of the channel bar 24, of the upper gate section in the manner shown in Figs. 8 and 9, and each of said bracket pieces 27, is secured upon a relatively long angle bar, which is in turn secured on the inner surface of the end walls 16, slightly inclined from vertical, as clearly shown in Figs. 4, 5, and 8. Secured upon the outer side of the end walls of the truck in suitable brackets for the purpose, are horizontal hand rods 29, by which the truck may be manipulated and rolled from place to place.

The operation is as follows:

When the truck is to be used for the transfer of relatively large articles, such as mail sacks or other similar objects, the side gates are telescoped and folded inwardly upon the floor 5, of the truck, in a manner similar to that shown in the right hand portion of Fig. 5, so that the sheet metal walls 20, of the respective side gates afford a false floor upon which the articles are placed. However, in the handling of small articles it becomes necessary to confine the same by the use of side walls, and accordingly the side gates are swung upwardly, the respective pawl levers 25, latching the same automatically in upright position, and if the truck is to be filled to its full capacity the upper sections of the side gates are extended and latched over the bracket pieces 27. Inasmuch as the respective side gates are independently extensible and independently foldable in a position out of use, it is obvious that during the unloading operation of a truck which has been filled to complete capacity, that one of the side gate members may be telescoped to facilitate the unloading operation and may readily be folded inwardly upon the floor of the truck to permit ready access to the remaining articles, which would otherwise be difficult to reach.

It is obvious that the truck may be easily manipulated by one person and steered from place to place by merely tilting the same on the main roller wheels 12, and using the end handle bars 29, for the purpose. This type of truck is preferable over those now in use, in view of the fact that at no time is it necessary for the same to remain idle and thus occupy space, due to possible unfitness for carrying certain kinds of loads, and the ease with which the parts may be adjusted to facilitate loading and unloading of the same effects a great saving and economy of time.

I am aware that various details of construction may be varied through a wide range without departing from the principles of this invention, and I therefore do not purpose limiting the patent granted otherwise than necessitated by the prior art.

I claim as my invention:

1. In a truck of the class described walls at each end thereof, and telescoping side walls adapted to be folded inwardly upon the floor of the truck.

2. In a truck of the class described a floor, end walls rigidly associated therewith, and telescoping side walls independently operatable adapted to be extended for use between said end walls and to be folded flat upon said floor out of use, and latching means acting automatically to lock said side walls in upright position when the same are moved thereinto.

3. In a truck of the class described the combination with a floor, of end walls rigidly associated therewith, telescoping side walls hingedly connected to said floor adapted to be moved into an upright position between said end walls, and latching means acting automatically to lock said side walls in an upright position when moved thereinto.

4. In a truck of the class described end walls, and foldable telescoping side walls mounted therebetween adapted to be moved into an upright position between said end walls when extended and interlocked therewith.

5. In a truck of the class described the combination with a frame, of foldable side walls adapted to be swung toward one another into a horizontal position out of use, and to be moved into an upright position for use, and sections telescoping into said side walls adapted to be extended to increase the height thereof when in position for use.

6. In a truck of the class described inwardly foldable side walls, means automatically latching the same in upright position when moved thereinto, and sections telescoping into said side walls adapted when extended to increase the height thereof.

7. In a truck of the class described the combination with the floor and end walls, of side gates folded inwardly to lie flat upon the floor of the truck and when swung outwardly to assume an upright position forming walls extending between said end walls, and telescoping sections forming a part of said side gates adapted when extended to increase the height thereof when in erected position.

8. In a truck of the class described the combination with the floor and end walls, of side gates comprising lower sections of sheet metal forming the side walls adapted to be folded inwardly upon the floor of the truck to form a false bottom therefor, and to be folded into an upright position, tubular members associated therewith, and extensible sections adapted to telescope into said tubular members and when extended to increase the height of the side gates erected for use.

In testimony whereof I have hereunto subscribed my name in the presence of two subscribing witnesses.

PATRICK J. MADIGAN.

Witnesses:
CHARLES W. HILLS, Jr.,
EARL M. HARDINE.

Copies of this patent may be obtained for five cents each, by addressing the "Commissioner of Patents, Washington, D. C."